(12) United States Patent
Schultz et al.

(10) Patent No.: US 7,829,973 B2
(45) Date of Patent: Nov. 9, 2010

(54) N CELL HEIGHT DECOUPLING CIRCUIT

(75) Inventors: Richard T. Schultz, Fort Collins, CO (US); Thomas R. O'Brien, Windsor, CO (US); Viswanathan Lakshmanan, Thornton, CO (US); David M. Ratchkov, Santa Clara, CA (US); Stefan G. Block, Munich (DE)

(73) Assignee: LSI Corporation, Milpitas, CA (US)

( * ) Notice: Subject to any disclaimer, the term of this patent is extended or adjusted under 35 U.S.C. 154(b) by 518 days.

(21) Appl. No.: 11/843,768

(22) Filed: Aug. 23, 2007

(65) Prior Publication Data
US 2009/0051006 A1    Feb. 26, 2009

(51) Int. Cl.
*H01G 4/40* (2006.01)
(52) U.S. Cl. ..................................... 257/532
(58) Field of Classification Search ......... 257/355–360, 257/363, 371, 380, 532; 327/436, 437, 530; 307/110, 43, 72, 77, 80; 333/12, 181, 182
See application file for complete search history.

(56) References Cited
U.S. PATENT DOCUMENTS

| | | | | |
|---|---|---|---|---|
| 5,130,611 A | * | 7/1992 | Johns | 315/224 |
| 5,218,222 A | * | 6/1993 | Roberts | 257/362 |
| 5,742,902 A | * | 4/1998 | Shore | 455/336 |
| 5,789,964 A | * | 8/1998 | Voldman | 327/380 |
| 5,883,423 A | * | 3/1999 | Patwa et al. | 257/532 |
| 2006/0166457 A1 | * | 7/2006 | Liu et al. | 438/400 |
| 2008/0042765 A1 | * | 2/2008 | Tarng et al. | 331/167 |

FOREIGN PATENT DOCUMENTS

| | | | |
|---|---|---|---|
| JP | 94329014 | * | 7/1996 |
| JP | 96290586 | * | 5/1998 |

* cited by examiner

*Primary Examiner*—Wai-Sing Louie
*Assistant Examiner*—Sue Tang
(74) *Attorney, Agent, or Firm*—Luedeka, Neely & Graham, P.C.

(57) ABSTRACT

A decoupling circuit disposed between a first rail and a second rail, where a third power rail is disposed between the first and second rails. A resistor having a first electrode and a second electrode is disposed between the first and second rails. Two capacitors are disposed between the first and second rails. The resistor is connected to the third rail and the two capacitors. In this manner, the two capacitors are connected in series with respect to the resistor, and in parallel with respect to one another. A first of the two capacitors is connected to the first rail, and a second of the two capacitors is connected to the second rail. At least one of the resistor and the two capacitors is disposed at least in part beneath the third rail.

20 Claims, 6 Drawing Sheets

N CELL HEIGHT DECOUPLING CIRCUIT

FIELD

This invention relates to the field of integrated circuit fabrication. More particularly, this invention relates to a circuit design for a decoupling capacitor circuit.

BACKGROUND

Decoupling capacitors are used in integrated circuits to electrically decouple one part of the integrated circuit from another part of the integrated circuit. As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

Decoupling capacitors are typically formed in a circuit with a resistor, with the resistor and the capacitor in series, such as between the power VDD and ground VSS rails of the integrated circuit. Unfortunately, these combinations of a single capacitor with a single resistor tend to require a lot of surface area, and thus can be difficult to place, especially as the trend to decrease chip size continues.

What is needed, therefore, is a decoupling circuit design that increases the apparent capacitance density, so that—for example—smaller decoupling structures can be placed in the circuit, and yet provide the same capacitance.

SUMMARY

The above and other needs are met by a decoupling circuit disposed between a first power rail and a second power rail each having a first potential, where a third power rail having a second potential is disposed between the first power rail and the second power rail. The first potential is different from the second potential. The decoupling circuit includes a resistor having a first electrode and a second electrode, where the resistor is disposed between the first power rail and the second power rail. The circuit also includes at least two capacitors, each having a first electrode and a second electrode. The at least two capacitors are disposed between the first power rail and the second power rail. The first electrode of the resistor is directly electrically connected to the third power rail, and the second electrode of the resistor is directly electrically connected to all of the first electrodes of the at least two capacitors. In this manner, the at least two capacitors are electrically connected in series with respect to the resistor, and the at least two capacitors are electrically connected in parallel with respect to one another. The second electrode of a first of the at least two capacitors is directly electrically connected to the first power rail, and the second electrode of a second of the at least two capacitors is directly electrically connected to the second power rail. At least one of the resistor and the at least two capacitors is disposed at least in part beneath the third power rail.

In various embodiments, the second electrodes of the at least two capacitors are directly electrically connected to both the first power rail and the second power rail. In one embodiment the first potential is VDD and the second potential is VSS, and in other embodiments the first potential is VSS and the second potential is VDD. The resistor and at least one of the at least two capacitors are both disposed at least in part beneath the third power rail, in some embodiments. Some embodiments include a contiguous N-well disposed beneath and on either side of the third rail, with the resistor and the at least two capacitors all wholly disposed within the N-well. In some embodiments the resistor is a polysilicon electrostatic discharge resistor. In some embodiments the at least two capacitors are both P-channel polysilicon capacitors.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
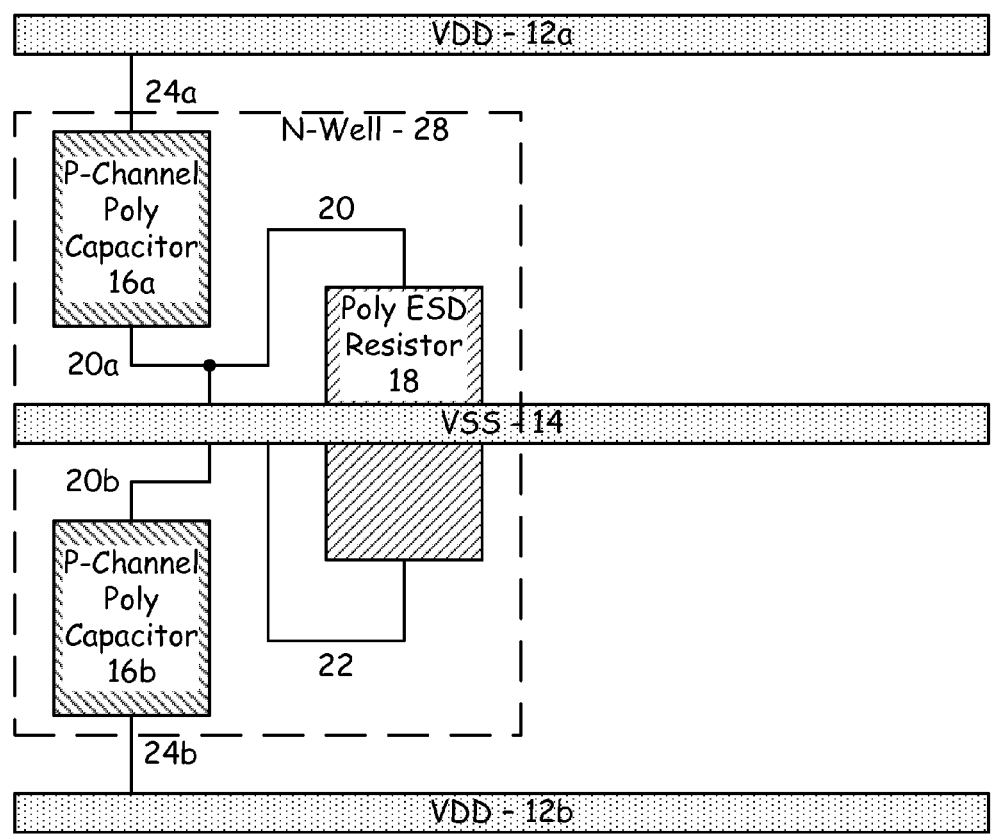
FIG. 1 is a circuit diagram depicting a decoupling capacitor circuit with a single resistor connected in series with more than one capacitor between three rails, with the resistor disposed at least partially beneath one of the rails.

With reference now to FIG. 1, there is depicted a circuit diagram of a decoupling capacitor circuit with a single resistor 18 connected in series with two capacitors 16a and 16b between three rails, being first power rail VDD 12a, ground rail VSS 14, and second power rail VDD 12b. The resistor 18, which in this embodiment is a polysilicon electrostatic discharge resistor, is disposed at least partially beneath the VSS rail 14. The resistor 18 is electrically connected at one electrode to the VSS rail 14, such as by line 22, and is then connected in series to the P-channel polysilicon capacitors 16a and 16b, such as by line 20 that splits to lines 20a and 20b, which capacitors are disposed in parallel one to another. The other electrodes of each of the two capacitors 16a and 16b are individually connected to the power rails VDD 12a and VDD 12b, respectively, such as by lines 24a and 24b.

The lines in present discussion, such as lines 20a and 20b, represent direct electrical connections. By direct electrical connection it is meant that the lines are electrically conductive in such a manner that there is no significant resistance drop or capacitance effect along the line, nor are there any active devices (such as transistors) or passive devices (such as resistors or capacitors) disposed along the line between the elements that are directly electrically connected.

Thus, the embodiment of FIG. 1 depicts a circuit where decoupling is provided between VDD 12a and VSS 14, and also between VDD 12b and VSS 14, by a single "double height" circuit, in that it resides in the space between two different rail sets. However, because the circuit uses only one resistor 18 as the front for both of the two capacitors 16a and 16b, it uses less surface area of the integrated circuit 10 than would a circuit that had a separate resistor 18 for each of the capacitors 16a and 16b, as is typically done.

In addition, the resistor 18 is, in the embodiment depicted, disposed at least partially under one of the rails, in this example the VSS ground rail 14, which is disposed between the two VDD power rails 12a and 12b. By placing the resistor 18 in this position, the resistor 18 takes less apparent surface area than it otherwise would have, had it not been disposed at least partially under one of the rails. The N-well 28 in this embodiment extends beneath the common rail, which in this embodiment is the VSS ground rail 14. The rails 12 and 14 are thus disposed in layers that overlie the capacitors 16 and resistor 18, such as in the M1 metal layer.

Figure 2:
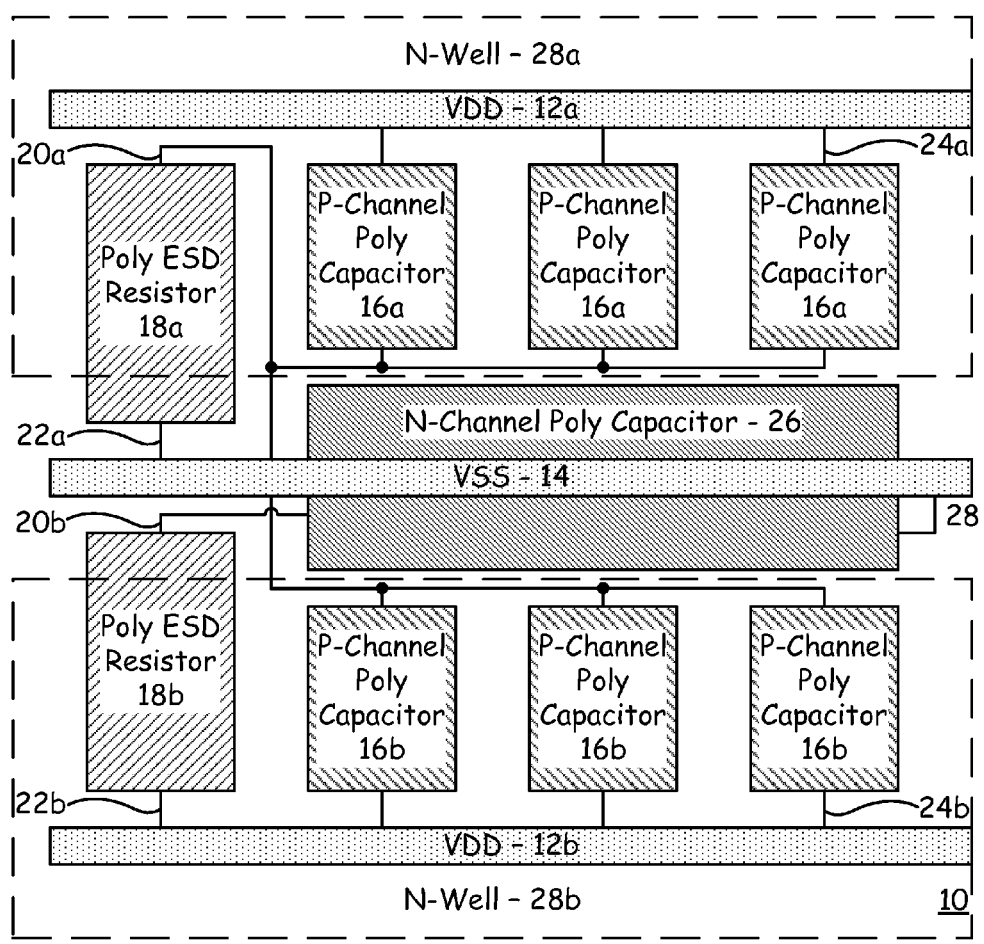
FIG. 2 is a circuit diagram depicting a decoupling capacitor circuit with a resistor connected in series with one or more capacitors between two or three rails, with one of the capacitors disposed at least partially beneath one of the rails.

FIG. 2 is a circuit diagram depicting a decoupling capacitor circuit with a resistor 18b connected in series with one capacitor 26 between two rails, and with a second resistor 18a connected in series with a plurality of capacitors 16a and 16b between three rails. The resistor 18b, in this example, is connected with line 22b to the VDD power rail 12b, and is then connected in series to the capacitor 26 via line 20b. The capacitor 26 is connected to the VSS ground rail 14 via line 28. As depicted in this embodiment, the poly capacitor 26 is disposed beneath one of the rails 12 and 14, at least in part. More specifically, the capacitor 26 is disposed beneath the common VSS ground rail 14. Thus, this portion of the circuit includes one aspect of the invention, which is that a portion of either the resistor 18 or the capacitor 16 or 26 is disposed at least in part beneath one of the rails 12 and 14.

The resistor 18a is tied to the VSS ground rail 14 via line 22a, and is then tied in series to the capacitors 16a and 16b via line 20a. The capacitors 16a and 16b in this embodiment are all disposed in parallel. The capacitors 16a are tied to the VDD power rail 12a via lines 24a, and the capacitors 16b are tied to the VDD power rail 12b via lines 24b. Thus, this portion of the circuit includes another aspect of the invention, which is that a single resistor 18 is used to front a plurality of capacitors 16 disposed on either side of a common rail, in what has been described above as a double height configuration. In the embodiment depicted in FIG. 2, there are two separate N-wells 28a and 28b.

Figure 3:
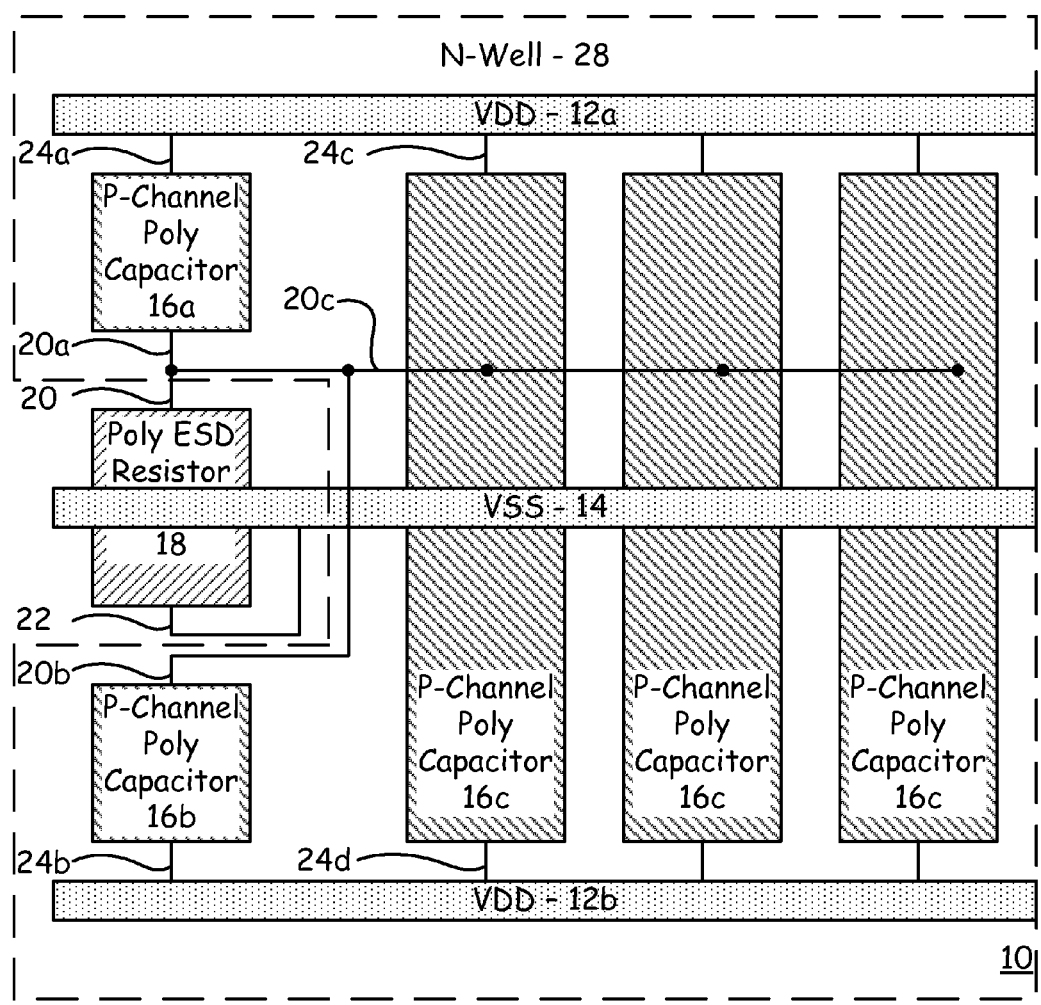
FIG. 3 is a circuit diagram depicting a decoupling capacitor circuit with a single resistor connected in series with more than one capacitor between three rails, with the resistor and at least one of the capacitors disposed at least partially beneath one of the rails.

FIG. 3 depicts another embodiment of a decoupling circuit according to the present invention, where a single resistor 18 is used to front more than one capacitor 16, and where both the resistor 18 and at least one of the capacitors 16c are disposed at least in part beneath one of the rails 12 and 14, in this embodiment the common VSS ground rail 14.

As depicted in the embodiment of FIG. 3, the resistor 18 is tied to the VSS ground rail 14 via line 22, and is then connected in series to the capacitors 16a, 16b, and 16c via line 20, which separates in parallel to lines 20a, 20b, and 20c. Capacitor 16a is connected at the other electrode to VDD power rail 12a, and capacitor 16b is connected at the other electrode to VDD power rail 12b. Thus, this portion of the circuit incorporates two aspects of the present invention, in that a single resistor 18 is fronting more than one capacitor 16, in the double height configuration. Further, the resistor 18 is disposed at least in part beneath the common VSS ground rail 14.

The capacitors 16c are connected to both the VDD power rail 12a via lines 24c and to the VDD power rail 12b via lines 24d. Thus, this portion of the decoupling circuit also incorporates two aspects of the present invention, in that a single resistor 18 is used to front more than one capacitor 16, and both the resistor 18 and the capacitors 16c are disposed at least in part beneath one of the rails 12 and 14—in this embodiment beneath the common VSS ground rail 14. Thus, this portion of the circuit also exhibits the double cell height aspect of the invention. There is a single N-well 28 in this embodiment, which extends completely around all of the capacitors 16, but which excludes the resistor 18.

Figure 4:
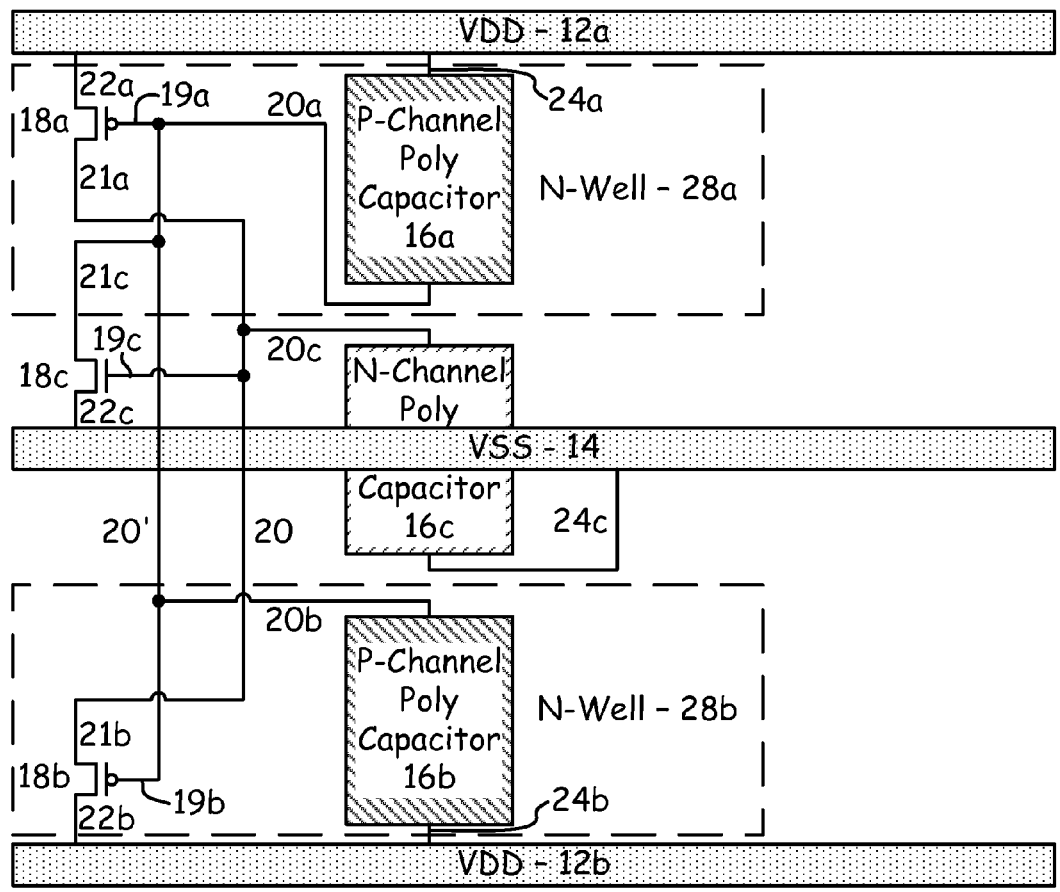
FIG. 4 is a circuit diagram depicting a decoupling capacitor circuit with three transistors connected in series with more than one capacitor between three rails, with at least one of the transistors and at least one of the capacitors disposed at least partially beneath one of the rails.

FIG. 4 depicts an embodiment where transistors 18 are used to pull up or pull down the level on capacitors 16, instead of resistors 18. The NMOS transistor 18c is connected to the VSS ground rail 14 via line 22c. The NMOS transistor 18c is preferably disposed beneath the VSS ground rail 14, at least in part. The transistor 18c is not depicted in this manner, because it would make the drawing extremely difficult to interpret. The gate 19c of transistor 18c is connected to line 20, and the drain 21c is connected to line 20'.

PMOS transistor 18b is connected to the VDD power rail 12b via line 22b. The gate 19b is connected to line 20', and the drain 21b is connected to line 20. Similarly, PMOS transistor 18a is connected to the VDD power rail 12a via line 22a. The gate 19a is connected to line 20', and the drain 21a is connected to line 20.

Line 20c is connected at one end to line 20, and at the other end to the N-channel polysilicon capacitor 16c, the other electrode of which is connected via line 24c to the VSS ground rail 14. Line 20b is connected at one end to line 20', and at the other end to the P-channel polysilicon capacitor 16b, the other electrode of which is connected via line 24b to the VDD power rail 12b. Similarly, Line 20a is connected at one end to line 20', and at the other end to the P-channel polysilicon capacitor 16a, the other electrode of which is connected via line 24a to the VDD power rail 12a. Separate N-wells 28a and 28b are disposed so as to encompass the PMOS transistors 18a and 18b and the P-channel capacitors 16a and 16b. Thus, the NMOS transistor 18c and the N-channel capacitor 16c are disposed in P-doped regions of the circuit 10.

Thus, the embodiment depicted in FIG. 4 also exhibits some of the characteristics as described above. The circuit is a dual height cell, or in other words, is a single circuit that resides between three power rails 12a, 14, and 12b—what would have been considered in the past to be two separate spaces, thus indicating the name of a "dual-height"cell. Two of the circuit elements, in this case the NMOS transistor 18c and the N-channel capacitor 16c, are disposed at least in part beneath one of the power rails, in this example the VSS ground rail 14. Thus, the circuit as depicted in FIG. 4 makes efficient use of space, by using a single circuit to buffer three rails, while disposing some of the circuit elements beneath at least one of the rails.

The three transistors 18 are connected in series to the capacitors 16. Line 20 is connected to lines 20a, 20b, and 20c, which connect to N-Channel capacitor 16c, and P-channel capacitors 16a and 16c, respectively.

Figure 5:
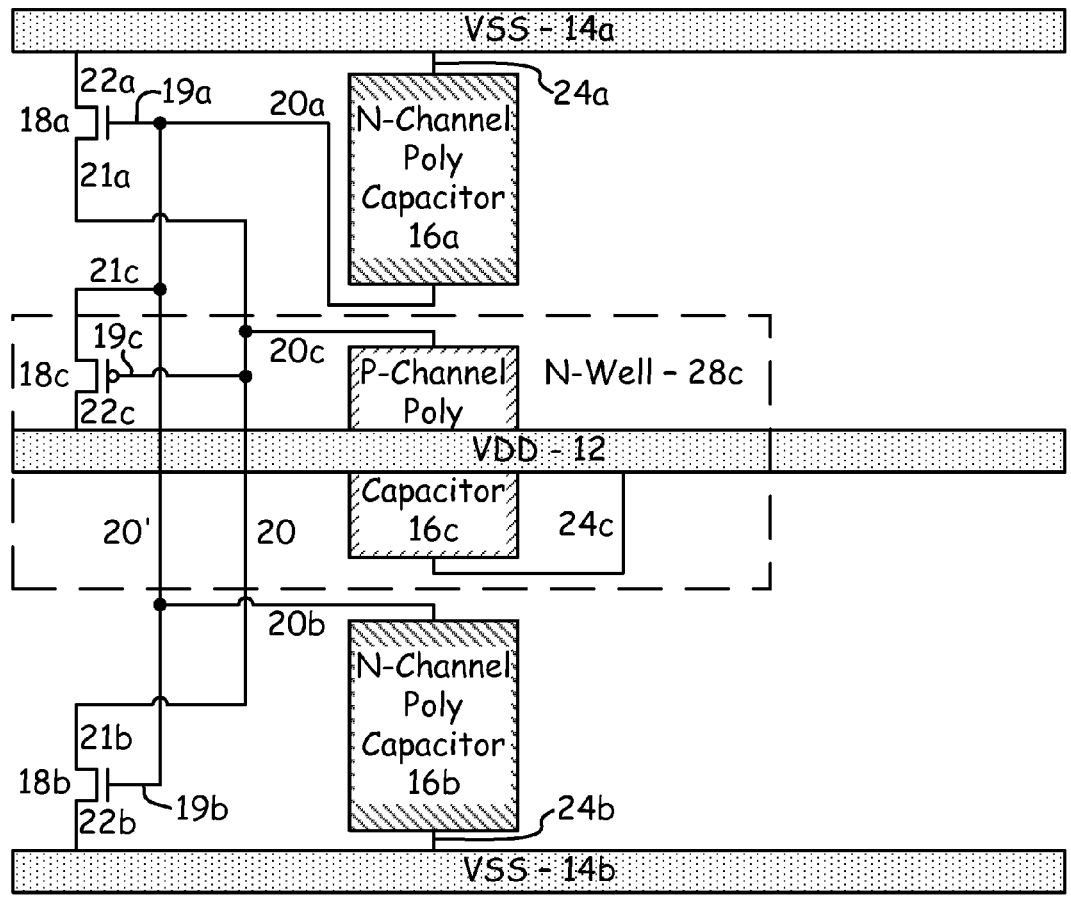
FIG. 5 is a circuit diagram depicting a decoupling capacitor circuit with three transistors connected in series with more than one capacitor between three rails, with at least one of the transistors and at least one of the capacitors disposed at least partially beneath one of the rails.

FIG. 5 depicts an embodiment similar to that as depicted in FIG. 4, in that transistors 18 are used to pull up or pull down the capacitors 16, but where the dual height coupling cell is disposed between two VSS ground rails 14a and 14b, instead of between two VDD power rails 12a and 12b. Thus, in this embodiment the transistors 18a and 18b are NMOS transistors and transistors 18C is a PMOS transistor. In similar fashion, capacitors 16a and 16b are N-channel polysilicon capacitors, and capacitor 16c is a P-channel polysilicon capacitor. In this embodiment, the N-well 28c is disposed under the VDD power rail 12, at least in part, and encompasses the P-channel capacitor 16c and the PMOS transistor 18c. As before, the PMOS transistor 18c is disposed at least in part beneath the middle VDD power rail 12—but is not so depicted so as to not unduly confuse the drawing.

Thus, the embodiment as depicted in FIG. 5 is a dual height coupling cell where at least some of the elements of the cell, other than mere conducting lines, are disposed at least in part beneath one of the "middle" rails of the dual height cell—in this example the VDD power rail 12.

Figure 6:
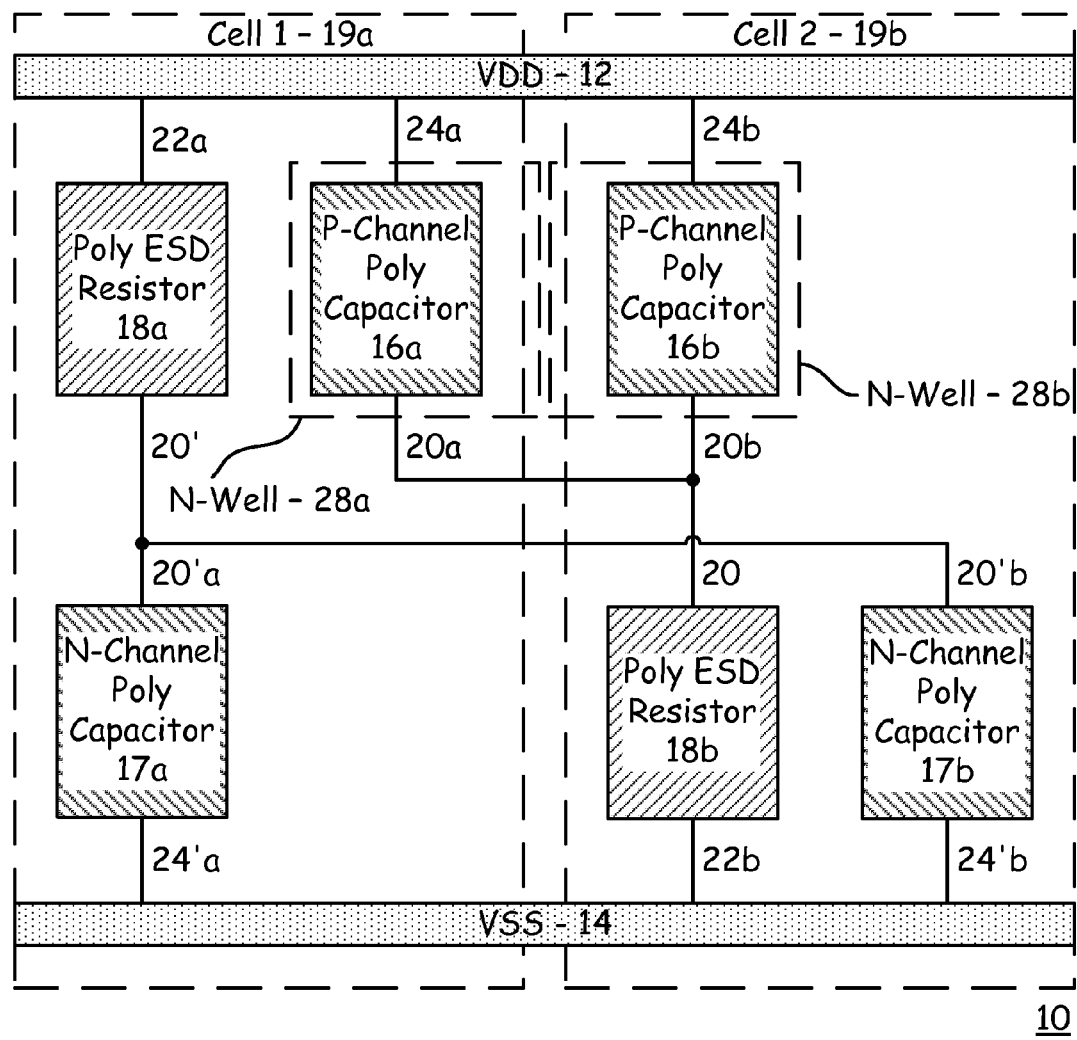
FIG. 6 is a circuit diagram depicting a decoupling capacitor circuit with two resistors connected in series with more than one capacitor between two rails.

FIG. 6 depicts a dual decoupling cell, where the two units of the dual decoupling cell—cell 1 19a and cell 2 19b—are disposed side by side, instead of one on top of the other. In other words, the dual nature of this decoupling cell could be described as horizontal, whereas the dual nature of the decoupling cells in the prior embodiments could be described as vertical. Stated yet another way, the units of this decoupling cell are disposed side by side between one set of rails 12 and 14, whereas the prior embodiments were disposed between two sets of rails 12 and 14 that shared a rail in common.

In the embodiment depicted in FIG. 6, resistor 18a is connected to VDD power rail 12 via line 22a, and then is also connected by line 20' to lines 20'a and 20'b. N-channel capacitor 17a is connected to line 20'a and is also connected by line 24'a to VSS ground rail 14. In like manner, N-channel capacitor 17b is connected to line 20'b and is also connected by line 24'b to VSS ground rail 14.

Resistor 18b is connected to VSS ground rail 14 via line 22b, and then is also connected by line 20 to lines 20a and 20b. P-channel capacitor 16a is connected to line 20a and is also connected by line 24a to VDD power rail 12. In like manner, P-channel capacitor 16b is connected to line 20b and is also connected by line 24b to VDD power rail 12.

As depicted, the embodiment of FIG. 6 does not have any elements that are disposed beneath one of the rails 12 or 14, as the dual nature of the decoupling cell is horizontal between adjacent rails, instead of vertical between two sets of rails with a rail in common, where a portion of the cell would be disposed beneath the center common rail of the two adjacent sets of rails. However, a single resistor from one cell is used to front two capacitors—one each residing in two cells. N-well 28a encompasses the P-channel capacitor 16a—and could optionally encompass the resistor 18a. Similarly, N-well 28b encompasses the P-channel capacitor 16b—and could optionally encompass the resistor 18b. Further, a single N-well 28 could be used to encompass the P-channel capacitors 16a and 16b.

In various embodiments, the resistors 18 have either silicided or unsilicided electrodes. The decoupling cells as described herein are dual cells, but could also be triple, quadruple, or N-degree cells. This could be accomplished in either a horizontal manner, such as depicted in FIG. 6, or in a vertical manner, such as depicted in FIG. 1. For the vertical cells, the area under the intervening rails is preferably used for fronting elements 18 (resistors or transistors) or the capacitors, as depicted in the various figures.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A decoupling circuit disposed between a first power rail and a second power rail each having a first potential, where a third power rail having a second potential is disposed between the first power rail and the second power rail, where the first potential is different from the second potential, the decoupling circuit comprising:
   a resistor having a first electrode and a second electrode, the resistor disposed between the first power rail and the second power rail,
   at least two capacitors, each having a first electrode and a second electrode, the at least two capacitors disposed between the first power rail and the second power rail,
   the first electrode of the resistor directly electrically connected to the third power rail, and the second electrode of the resistor directly electrically connected to all of the first electrodes of the at least two capacitors,
   such that the at least two capacitors are electrically connected in series with respect to the resistor, and the at least two capacitors are electrically connected in parallel with respect to one another,
   the second electrode of a first of the at least two capacitors directly electrically connected to the first power rail, and
   the second electrode of a second of the at least two capacitors directly electrically connected to the second power rail,
   where at least one of the resistor and the at least two capacitors is disposed at least in part beneath the third power rail.

2. The decoupling circuit of claim 1, wherein the second electrodes of the at least two capacitors are directly electrically connected to both the first power rail and the second power rail.

3. The decoupling circuit of claim 1, wherein the first potential is VDD and the second potential is VSS.

4. The decoupling circuit of claim 1, wherein the first potential is VSS and the second potential is VDD.

5. The decoupling circuit of claim 1, wherein the resistor and at least one of the at least two capacitors are disposed at least in part beneath the third power rail.

6. The decoupling circuit of claim 1, further comprising a contiguous N-well disposed beneath and on either side of the third rail, the resistor and the at least two capacitors all wholly disposed within the N-well.

7. The decoupling circuit of claim 1, wherein the resistor is an unsilicided polysilicon electrostatic discharge resistor.

8. The decoupling circuit of claim 1, wherein the resistor is a silicided polysilicon electrostatic discharge resistor.

9. The decoupling circuit of claim 1, wherein the at least two capacitors are both P-channel polysilicon capacitors.

10. A decoupling circuit disposed between a first VDD power rail and a second VDD power rail, where a third VSS ground rail is disposed between the first power rail and the second power rail, the decoupling circuit comprising:
    a polysilicon resistor having a first electrode and a second electrode, the resistor disposed between the first VDD power rail and the second VDD power rail,
    at least two P-channel polysilicon capacitors, each having a first electrode and a second electrode, the at least two capacitors disposed between the first VDD power rail and the second VDD power rail, the first electrode of the resistor directly electrically connected to the third VSS ground rail, and the second electrode of the resistor directly electrically connected to all of the first electrodes of the at least two capacitors, such that the at least two capacitors are electrically connected in series with respect to the resistor, and the at least two capacitors are electrically connected in parallel with respect to one another, the second electrode of a first of the at least two capacitors directly electrically connected to the first VDD power rail, and the second electrode of a second of the at least two capacitors directly electrically connected to the second VDD power rail, where at least one of the resistor and the at least two capacitors is disposed at least in part beneath the third VSS ground rail.

11. The decoupling circuit of claim 10, wherein the resistor and at least one of the at least two capacitors are disposed at least in part beneath the third VSS ground rail.

12. The decoupling circuit of claim 10, further comprising a contiguous N-well disposed beneath and on either side of the third VSS ground rail, the resistor and the at least two capacitors all wholly disposed within the N-well.

13. The decoupling circuit of claim 10, wherein the resistor is a silicided polysilicon electrostatic discharge resistor.

14. An N-degree decoupling circuit disposed between a first power rail and a second power rail, where N−1 intervening power rails are disposed between the first power rail and the second power rail, where adjacent power rails have different potentials, the decoupling circuit comprising:

a pull-up/pull-down element having a first electrode and a second electrode, the pull-up/pull-down element disposed between the first power rail and the second power rail, at least two capacitors, each having a first electrode and a second electrode, the at least two capacitors disposed between the first power rail and the second power rail, the first electrode of the pull-up/pull-down element directly electrically connected to one of the intervening power rails, and the second electrode of the pull-up/pull-down element directly electrically connected to all of the first electrodes of the at least two capacitors, such that the at least two capacitors are electrically connected in series with respect to the pull-up/pull-down element, and the at least two capacitors are electrically connected in parallel with respect to one another, the second electrode of a first of the at least two capacitors directly electrically connected to the first power rail, and the second electrode of a second of the at least two capacitors directly electrically connected to the second power rail, where at least one of the pull-up/pull-down element and the at least two capacitors is disposed at least in part beneath at least one of the intervening power rails.

15. The decoupling circuit of claim 14, wherein the second electrodes of the at least two capacitors are directly electrically connected to both the first power rail and the second power rail.

16. The decoupling circuit of claim 14, further comprising a contiguous N-well disposed beneath and on either side of the intervening power rails, the pull-up/pull-down element and the at least two capacitors all wholly disposed within the N-well.

17. The decoupling circuit of claim 14, wherein the pull-up/pull-down element is an unsilicided polysilicon electrostatic discharge resistor.

18. The decoupling circuit of claim 14, wherein the pull-up/pull-down element is a silicided polysilicon electrostatic discharge resistor.

19. The decoupling circuit of claim 14, wherein the at least two capacitors are both P-channel polysilicon capacitors.

20. The decoupling circuit of claim 14, wherein the pull-up/pull-down element comprises at least one of a resistor and a transistor.

* * * * *